(12) United States Patent
Chang et al.

(10) Patent No.: US 9,173,082 B2
(45) Date of Patent: Oct. 27, 2015

(54) PREVENTING ROAMING USER TERMINAL RE-AUTHENTICATION (75) Inventors: Xiangqing Chang, Beijing (CN); Yang Shi, Beijing (CN); Jianfeng Liu, Beijing (CN); Haitao Zhang, Beijing (CN); Tao Zheng, Beijing (CN); Min Yao, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 151 days.

(21) Appl. No.: 13/884,559

(22) PCT Filed: Dec. 22, 2011

(86) PCT No.: PCT/CN2011/084426
§ 371 (c)(1),
(2), (4) Date: May 9, 2013

(87) PCT Pub. No.: WO2012/083865
PCT Pub. Date: Jun. 28, 2012

(65) Prior Publication Data
US 2013/0265941 A1    Oct. 10, 2013

(30) Foreign Application Priority Data

Dec. 24, 2010    (CN) .......................... 2010 1 0621703

(51) Int. Cl.
*H04L 12/56*    (2006.01)
*H04W 8/02*     (2009.01)
*H04L 12/28*    (2006.01)
(Continued)

(52) U.S. Cl.
CPC ............. *H04W 8/02* (2013.01); *H04L 12/2856* (2013.01); *H04L 12/4641* (2013.01); *H04W 12/06* (2013.01); *H04L 63/0815* (2013.01)

(58) Field of Classification Search
CPC ........................ H04L 63/0272; H04L 63/0428
USPC .................................... 370/328, 392; 709/225
See application file for complete search history.

(56) References Cited

U.S. PATENT DOCUMENTS

2004/0168054 A1    8/2004   Halasz et al.
2004/0203752 A1   10/2004   Wojaczynski et al.
(Continued)

FOREIGN PATENT DOCUMENTS

CN          1505314        6/2004
CN          1547343       11/2004
(Continued)

OTHER PUBLICATIONS

CN Fourth Office Action dated Jun. 19, 2014 issued on CN Patent Application No. 201010621703.8 dated Dec. 24, 2010, The State Intellectual Property Office, P.R. China.
(Continued)

*Primary Examiner* — Wanda Z Russell
(74) *Attorney, Agent, or Firm* — Mannava & Kang, P.C.

(57) ABSTRACT

A method and device for preventing a roaming user terminal from re-authentication are provided. The method includes: when Virtual Local Area Network (VLAN) of a roaming user terminal changes, change information of the roaming user terminal is reported to a Broadband Remote Access Server (BRAS) via an Access Controller (AC) and the BRAS reports modified information of the roaming user terminal to an Authentication, Authorization, Accounting server (AAA server).

13 Claims, 3 Drawing Sheets

(51) Int. Cl.
  *H04L 12/46* (2006.01)
  *H04W 12/06* (2009.01)
  *H04L 29/06* (2006.01)

(56) References Cited

U.S. PATENT DOCUMENTS

2006/0117104 A1* 6/2006 Taniguchi et al. ............ 709/225
2011/0142048 A1* 6/2011 Yoon ............................. 370/392

FOREIGN PATENT DOCUMENTS

| CN | 1765082 | 4/2006 |
| CN | 1822574 | 8/2006 |
| CN | 101026866 | 8/2007 |
| CN | 101127707 | 2/2008 |
| CN | 102075904 | 5/2011 |
| EP | 1670205 | 6/2006 |
| WO | WO2006118497 | 11/2006 |

OTHER PUBLICATIONS

CN First Office Action dated Oct. 10, 2012 issued on CN Patent Application No. 201010621703.8 filed on Dec. 24, 2010, State Intellectual Property Office of the People's Republic of China.
International Search Report and Written Opinion dated Mar. 15, 2012 issued on PCT Patent Application No. PCT/CN2011/084426 dated Dec. 22, 2011, The State Intellectual Property Office, the P.R. China.
Extended European Search Report dated Jun. 8, 2015, EP Patent Application No. 11851034.6 dated Dec. 22, 2011, European Patent Office.

* cited by examiner

PREVENTING ROAMING USER TERMINAL RE-AUTHENTICATION

CLAIM FOR PRIORITY

The present application is a national stage filing under 35 U.S.C. 371 of PCT application number PCT/CN2011/084426, having an international filing date of Dec. 22, 2011, which claims priority to Chinese Patent Application No. 201010621703.8, filed on Dec. 24, 2010, the disclosures of which are hereby incorporated by reference in their entireties.

BACKGROUND

Computing devices are becoming more mobile and more connected. When a wireless computing device migrates from a first access point to a second access point within a wireless network, re-authentication may be triggered. The re-authentication can disrupt the wireless service to the computing device and may disrupt the user's experience.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Computing devices can connect to each other and a variety of networks using a number of communication technologies. Wireless Local Area Network (WLAN) technologies are a communication technology that is widely used and includes the popular Wireless Fidelity (Wi-Fi) technology. Wireless networking allows two or more points to communicate that are not physically connected.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Figure 1:
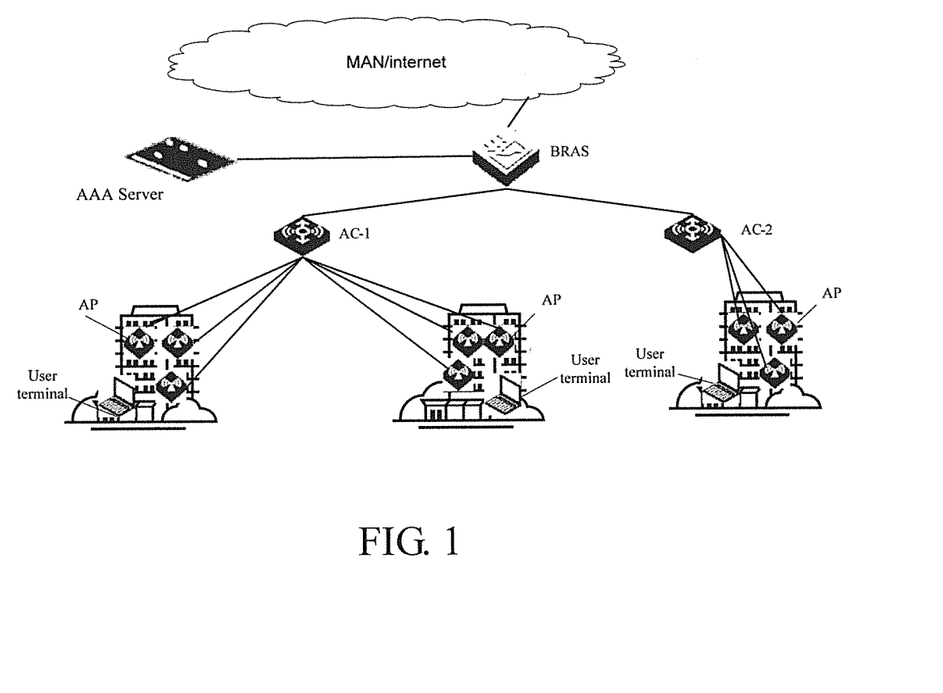
FIG. 1 is a diagram of a wireless network, according to one example of principles described herein.

FIG. 1 shows a centralized WLAN architecture (100) that includes Access Controllers (AC) (120, 122) and Access Points (AP) (125). The access controllers (120,122) can provide session control and traffic/bandwidth management for access points (125,127). For example, the access controllers (120,122) may make automatic adjustments to the transmitting power, channels, authentication, and security. The access points (125, 127) provide wireless connectivity to remote user terminals (130) by receiving and sending of wireless packets. In some implementations, the access controllers (120, 122) may be part of a mobility domain to allow clients access throughout large or regional office locations. As the remote user terminal (130) physically moves in relation to the access points (125, 127), the remote user terminal (130) can switch from a first access point (125) to a second access point (127) by dropping connectivity with a first access point (125) and picking up connectivity with a second access point (127). This often requires re-authentication of the remote user terminal (130). The re-authentication can disrupt the wireless service to the remote user terminal (130) and may disrupt the user's experience.

Another component within the WLAN architecture (100) is a Broadband Remote Access Server (BRAS) (110). The BRAS (110) routes traffic between the access controllers (120,122) and a network (105). For example, the network may be a Metropolitan Area Network (MAN) that accesses the internet. The BRAS (110) aggregates remote user terminal (130) sessions from the access controllers (120,122), injects policy management and enforces quality of service policies. The BRAS (110) is also responsible for assigning network parameters such as Internet Protocol (IP) addresses to the clients. A remote user terminal is authenticated by sending an access request to the access controller (120) via an access point (125). This access request is then passed to the BRAS (110). The BRAS (110) sends an authentication request and corresponding user information to an Authentication, Authorization, Accounting server (AAA server) (115). The AAA server (115) determines whether the remote user terminal (130) is a valid user, validates user credentials, and determines which serving strategy should be applied for the user, and sends the results to the BRAS (110) device. The BRAS (110) device executes actions according to results returned by the AAA server (115). The remote user terminal (130) can then access the network (105).

Wireless networks are adapted to provide connectivity to a variety of remote user terminals (130). When a remote user terminal (130) migrates from a first access point (125) to a second access point (127), the user's IP address within the Virtual Local Area Network (VLAN) may change. This triggers re-authentication of the remote user terminal (130) on the network (105). As discussed above, this re-authentication may include sending a re-authentication request from the remote user terminal (130) through the new access point (127) and its associated access controller (122) to the BRAS (110). The BRAS (110) then sends the authentication request to the AAA server (115). If the AAA server (115) validates the request, the BRAS (110) provides access to the remote user terminal (130) through the new access point (127) via its associated access controller (122). This process can disrupt communication between the remote user terminal (130) and the network (105). This disruption in service can significantly affect a user's experience. For example, if the user is consuming streaming media, the media stream would be disrupted. If the user is downloading a file, the downloading may be terminated and the user may have to start over with the download.

In some implementations, re-authentication can be prevented by modifying the user's credentials and/or communication stream at the access controller (120,122) to conceal the migration between access points (125) from BRAS (110). For example, the access controller (120, 122) determines when a remote user terminal (130) moves between access points (125). Then the access controller (120, 122) can encapsulate packets sent from the wireless network (105) and passed to the BRAS (110) so that the packets appear to have originated with the original access point (125). Thus, although the user is roaming, the BRAS (110) does not perceive the change in wireless access points and the IP address of the remote user terminal (130) remains the same.

If the remote user terminal (130) migrates from a first access point (125) controlled by a first access controller (120) to a second access point (127) controlled by a different access controller (122), the two access controllers (120, 122) can synchronize remote user terminal (130) information and continue to mask the migration between access points (125, 127). Data from the network (105) addressed to the remote user terminal (130) is transmitted transparently to the original access controller (120) and then forwarded to the new access controller (122) for distribution to the remote user terminal (130).

This method shields migration of the remote user terminal (130) from the BRAS (110) but can create a number of inefficiencies in the wireless network (105). For example, the BRAS (110) is unaware of the actual location of the remote user terminal (130) and is unable to accurately assess bandwidth controls and quality of services policies. This technique can also interfere with individualized control of different access points (125, 127).

Figure 2:
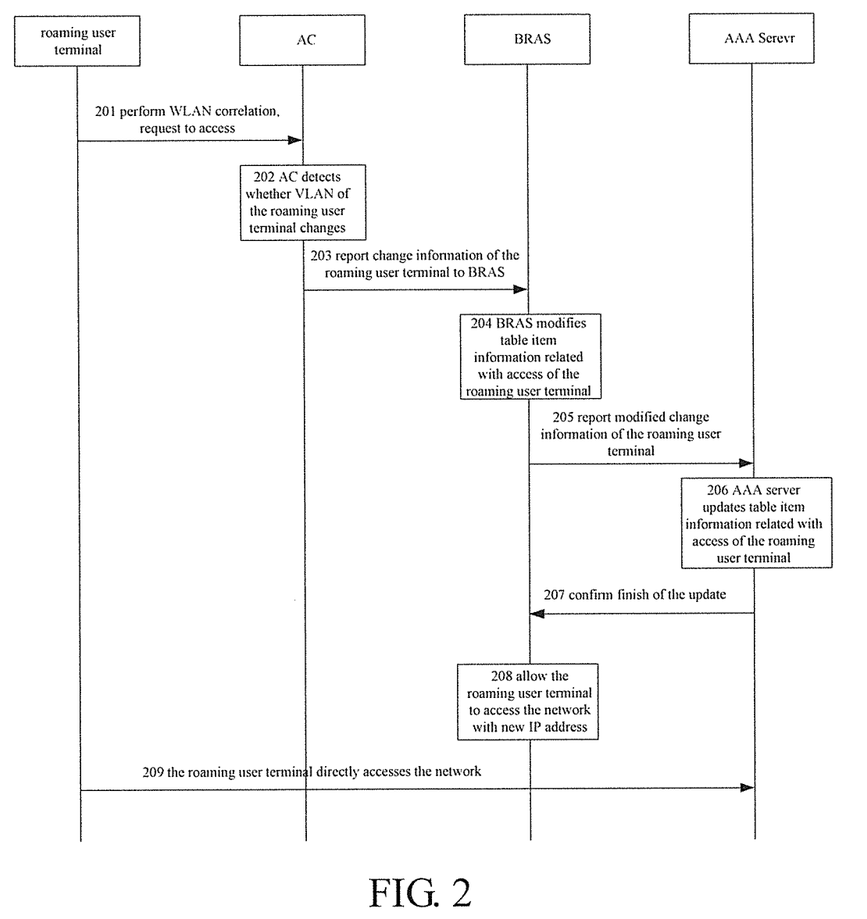
FIG. 2 is a flowchart of an illustrative method for preventing a roaming user terminal from re-authentication, according to one example of principles described herein.

FIG. 2 is a flowchart of one illustrative method for preventing a roaming user terminal from re-authentication. In block 201, a roaming wireless device communicates wirelessly with an access controller for WLAN correlation, to request access to the network, and to provide user data related with various network application services. For example, the user data may include a Uniform Resource Locator (URL) that the user desires to view on an internet browser.

In block 202, the access controller detects whether the wireless device has changed access points or moved between Virtual Local Area Networks (VLAN). A VLAN is a group of hosts with a common set of requirements that communicate as if they are attached to the same broadcast domain, regardless of their physical location. If no change is detected, the method proceeds to block 209 and provides the user with authentication and with direct access to the network as described above. If the access controller determines that the user has migrated to a different access point or VLAN, the access controller stores information identifying the change and the method proceeds to block 203.

For example, when a WLAN terminal sends a request to a first access point (125) for correlation, the first access point (125) may directly transmit the request transparently to the AC via a channel established between the first access point (125) and the AC. Subsequently, the AC may allow the WLAN terminal to access with correlation, record user information and AP information of the WLAN terminal. With migration of the WLAN terminal, when the WLAN terminal detecting that signal strength of a second access point (127) exceeds that of the first access point (125) and achieves a threshold, meanwhile packet loss rate between the WLAN terminal and the first access point (125) also achieves another threshold, the WLAN terminal may actively trigger roaming process, that is to say, may actively send a packet for re-correlation to the second access point (127). Similarly, the second access point (127) may not process the received packet for re-correlation, instead, send the packet to the AC via a channel established between the AC and the second access point (127). By querying previous user information, the AC may find that the WLAN terminal has already been correlated, learn the WLAN terminal currently accesses with a new access point, and confirm the WLAN terminal is a roaming user terminal. Thus, the AC may allow the WLAN terminal to re-correlate with the second access point (127). Subsequently, the WLAN terminal may send a packet to cancel the correlation with the first access point (125). The roaming is terminated.

In block 203, the access controller compares the current connection information of the roaming user terminal with the original pre-roaming connection information. This allows the access controller to determine if the migrating roaming user terminal is a legal user. Specifically speaking, there are two kinds of roaming, which are respectively roaming within an access controller and roaming between access controllers. Regarding the roaming within an access controller, a same access controller may directly obtain pre-roaming information. Regarding the roaming between access controllers, a roaming group may be set to include a pre-roaming access controller and an after-roaming access controller. Thus, the pre-roaming access controller and the after-roaming access controller may synchronize user information. When the roaming between access controllers occurs, the after-roaming access controller may learn pre-roaming information of a user by querying synchronized information. The access controller reports the current connection information of the wireless device to the BRAS.

Reported information of the roaming user terminal may include:

An identifier of a logic port accessed by the roaming user terminal: an access controller name/identifier+an AP name/identifier+an actual radio name/identifier+a logic port name/identifier;

a unique identifier of the roaming user terminal: Media Access Control (MAC) of the roaming user terminal. IP information of the roaming user terminal with unchanged VLAN, IP information of the roaming user terminal with changed VLAN;

state of the roaming user terminal: roaming;

time that the change of state occurs.

In block 204 the BRAS receives the information and modifies a connection table to include the information. This provides the BRAS with an accurate view of the location and connectivity of the wireless devices connected to the network.

In block 205, the BRAS reports the modified information of the roaming user terminal to the AAA server. This information could be reported in the form of a connection table. In one implementation, the connection table includes an identifier (ID) of the roaming user terminal. MAC of the roaming user terminal, IP of the roaming user terminal. VLAN of the roaming user terminal and state of the roaming user terminal.

For example, the connection table reported to the AAA server by the BRAS when a certain roaming user terminal is authenticated for the first time is shown in Table 1.

TABLE 1

| ID of device | MAC of roaming user terminal | IP of roaming user terminal | VLAN of roaming user terminal | State of roaming user terminal |
| --- | --- | --- | --- | --- |
| 10 | 001f-3cdd-25c5 | 60.11.162.36 | 162 | Authentication is passed. |

After roaming, the roaming user terminal modifies reported information as shown in Table 2, according to information reported by the access controller. Therefore, the BRAS reports the modified information of the roaming user terminal to the AAA server.

TABLE 2

| ID of device | MAC of roaming user terminal | IP of roaming user terminal | VLAN of roaming user terminal | State of roaming user terminal |
|---|---|---|---|---|
| 0 | 001f-3cdd-25c5 | 60.11.161.36 | 161 | Authentication is assed. |

In block 206, the AAA server updates table item information related to access of the roaming user terminal.

Information in original table item related with the roaming user terminal that is stored in the AAA server is shown in Table 3.

TABLE 3

| Name of device | Password | Access time | IP of roaming user terminal | VLAN of roaming user terminal | IP of access device |
|---|---|---|---|---|---|
| Zhang San | 123456 | 2008-01-11 18:52:18 | 60.11.162.36 | 162 | 60.11.1.36 |

After the user begins to roam, the original table item related information of the user stored in the AAA server is updated as shown in Table 4, according to the information reported by the BRAS.

TABLE 4

| Name of device | Password | Access time | IP of roaming user terminal | VLAN of roaming user terminal | IP of access device |
|---|---|---|---|---|---|
| Zhang San | 123456 | 2008-01-11 18:52:18 | 60.11.161.36 | 161 | 60.11.1.36 |

In block 207, the AAA server sends a confirmation message the BRAS, reporting that the update is complete.

In block 208, the BRAS allows the roaming user terminal to access the network with IP address of changed VLAN.

In block 209, the roaming user terminal directly accesses the network.

According to the implementation shown in FIG. 2, when there is no change of VLAN of the roaming user terminal, the roaming user terminal may directly access the network without further authentication. When the VLAN of the roaming user terminal changes, the illustrative method described above also allows the roaming user terminal to directly access the network with IP address of the changed VLAN without re-authentication.

Figure 3:
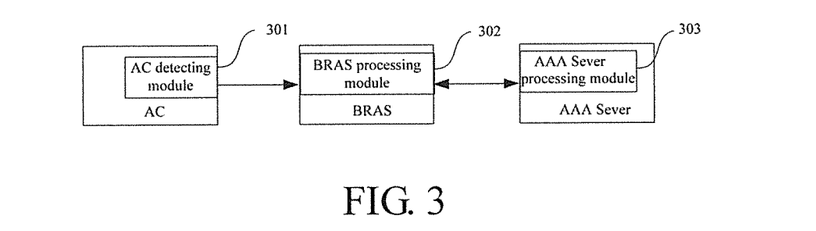
FIG. 3 is a diagram of an illustrative system for preventing a roaming user terminal from re-authenticating, according to one example of principles described herein.

FIG. 3 is a diagram of an illustrative system for preventing a roaming user terminal from re-authentication. The system includes an access controller detecting module (301) located in an access controller (120), a BRAS processing module (302) located in the BRAS (110), and an AAA Server processing module (303) located in the AAA server (115). The controller detecting module, BRAS processing module and AAA Server processing module may be hardware or software modules or a combination thereof. The modules may be implemented as machine readable instructions stored in a memory and executable by a processor or as electronic logic or circuitry designed to execute the functions described below.

The access controller detecting module (301) is designed to receive an access request from a roaming user terminal, and detect whether the VLAN of the roaming user terminal changes. The access controller detecting module (301) compares the pre-roaming VLAN of the roaming user terminal stored in the access controller with the after-roaming VLAN of the roaming user terminal. When the pre-roaming VLAN is the same as the after-roaming VLAN, the access controller detecting module (301) determines the VLAN of the roaming user terminal is unchanged. Otherwise, the access controller detecting module (301) determines the VLAN of the roaming user terminal has changed.

When a change in the VLAN of the roaming user terminal is detected, the access controller detecting module (301) reports the roaming user terminal information to the BRAS processing module (302). If no change is detected, the roaming user terminal directly accesses the network.

The roaming user terminal information reported by the access controller detecting module (301) may include a variety of data. For example, the terminal information may include an identifier of a logic port accessed by the roaming user terminal. This logic port identifier may include an AC name/identifier+an AP name/identifier+an actual radio name/identifier+a logic port name/identifier. The terminal information may also include a unique identifier of the roaming user terminal: MAC of the roaming user terminal, IP information of unchanged VLAN of the roaming user terminal, and IP information of changed VLAN of the roaming user terminal. The terminal information may also include a state of the roaming user terminal (roaming or not roaming) and time of the change in state.

The BRAS processing module (302) connects with the access controller detecting module (301) and the AAA server processing module (303) and receives the changed information about the roaming user terminal reported by the access controller detecting module (301). The BRAS processing module modifies the BRAS table according to the changed information and reports the changed information to the AAA server processing module (303). The BRAS (110) receives a confirmation message sent by the AAA server processing module (303) reporting that the update is complete. The roaming user terminal is then allowed to access the network with the IP address of the changed VLAN.

The modified roaming user terminal information reported by the BRAS processing module (302) to the AAA server processing module (303) includes: an ID of the roaming user terminal, MAC of the roaming user terminal, IP of the roaming user terminal, VLAN of the roaming user terminal and state of the roaming user terminal.

The AAA server processing module (303) connects with the BRAS processing module (302) and receives the changed information of the roaming user terminal reported by the BRAS processing module (302). The AAA server modifies entries in the AAA server table according to the changed information and sends a confirmation of the update to the BRAS processing module (302).

In some implementations, the access controller (120), the BRAS (110), and the AAA server (115) may be implemented separately on appropriate computing devices interconnected by the Ethernet. The access controller (120), BRAS (110), and the AAA server (115) may be implemented, separately or in combination on multi-core processors.

Figure 4:
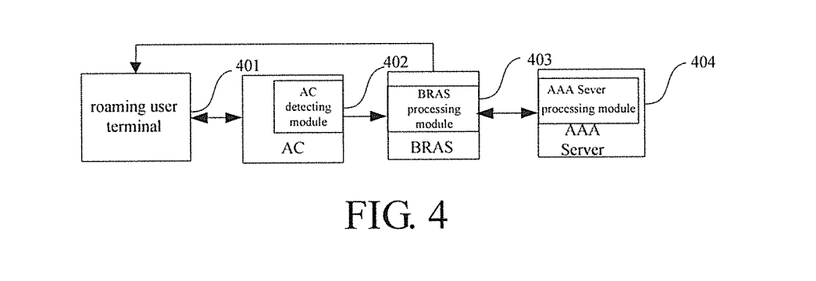
FIG. 4 is a diagram of an illustrative system for preventing a roaming user terminal from re-authenticating, according to one example of principles described herein.

FIG. 4 shows a system for preventing a roaming user terminal from re-authentication that includes a roaming user terminal (401), an access controller (402), a BRAS (403) and an AAA server (404).

The roaming user terminal (401) sends an access request to the access controller (402). After receiving the access request sent by the roaming user terminal (401), the access controller (402) detects whether VLAN of the roaming user terminal (401) has changed. When the VLAN of the roaming user terminal (401) is changed, the access controller (402) reports the changed information of the roaming user terminal to the BRAS (403). The BRAS (403) receives the changed information, including the changed VLAN reported by the access controller (402). The BRAS modifies the corresponding table items and reports the updated roaming user terminal information to the AAA server (404). After receiving the modified information reported by the BRAS (403), the AAA server (404) updates a corresponding AAA table and sends a confirmation message to the BRAS (403) indicating that the update is complete. This allows the roaming user terminal (401) to access the network with the IP address of the changed VLAN. When detecting that the VLAN of the roaming user terminal (401) has not changed, the access controller (402) allows the roaming user terminal (401) to directly access the network with the IP address of the unchanged VLAN.

In conclusion, the systems and methods described above allow a roaming user terminal to migrate between access points and VLANs in a wireless network without re-authentication. This can be accomplished by detecting changes in the access points and/or the VLAN the roaming user terminal is connected to and updating tables in the access controller, BRAS, and AAA server. Appropriate information is then returned to the BRAS to allow a properly authenticated user terminal to migrate between access points without re-authentication. The roaming user terminal is allowed to access a network with an Internet Protocol (IP) address of changed VLAN. Thus, re-authentication of the roaming user terminal with changed VLAN may be avoided while accurately updating the BRAS with the actual access point of the roaming user terminal.

The preceding description has been presented only to illustrate and describe examples of the principles described. This description is not intended to be exhaustive or to limit these principles to any precise form disclosed. Many modifications and variations are possible in light of the above teaching.

The invention claimed is:

1. A method for preventing a roaming user terminal from re-authentication, comprising:
   receiving, by a Broadband Remote Access Server (BRAS), change information of a roaming user terminal reported by an Access Controller (AC), the change information indicating that a Virtual Local Area Network (VLAN) of the roaming user terminal has changed, wherein the change information of the roaming user terminal received by the BRAS comprises an identifier of a logic port accessed by the roaming user terminal, a unique identifier of the roaming user terminal, a state of the roaming user terminal, and a time that the state changed;
   modifying, by the BRAS, information of the roaming user terminal corresponding to the change information reported by the AC, wherein the modified information of the roaming user terminal is an item in a table maintained at the BRAS;
   reporting, by the BRAS, the modified information of the roaming user terminal to an Authentication, Authorization, Accounting server (AAA Server); and
   allowing, by the BRAS, the roaming user terminal to access a network with an Internet Protocol (IP) address of the changed VLAN.

2. The method according to claim 1, further comprising:
   receiving, by the BRAS, a confirmation from the AAA server after the AAA server has modified corresponding table item information of the roaming user terminal based on the modified information of the roaming user terminal reported by the BRAS.

3. The method according to claim 2, wherein allowing the roaming user terminal to access the network includes:
   after receiving the confirmation from the AAA server, allowing, by the BRAS, the access of the roaming user terminal to the network with the IP address of the changed VLAN.

4. The method according to claim 1, wherein the identifier of the logic port accessed by the roaming user terminal comprises an AC identifier, an Access Point (AP) identifier, a radio identifier, and a logic port name.

5. The method according to claim 1, wherein the unique identifier of the roaming user terminal comprises Media Access Control (MAC) of the roaming user terminal, IP information of a previous VLAN of the roaming user terminal, and IP information of the changed VLAN of the roaming user terminal.

6. The method according to claim 1, wherein the state of the roaming user terminal comprises an indication that the user terminal is roaming, and the time that the state changed comprises a time at which roaming began.

7. The method according to claim 1, wherein the modified information of the roaming user terminal reported by the BRAS to the AAA Server comprises an identifier (ID) of the roaming user terminal, the Media Access Control (MAC) of the roaming user terminal, the IP address of the roaming user terminal, the VLAN of the roaming user terminal and the state of the roaming user terminal.

8. A Broadband Remote Access Server (BRAS) for preventing a roaming user terminal from re-authentication, comprising:
   a processor;
   a memory on which is stored machine readable instructions that are to cause the processor to:
      receive change information of the roaming user terminal with a changed Virtual Local Area Network (VLAN), wherein the change information is reported by an Access Controller (AC), and wherein the change information of the roaming user terminal with the changed VLAN comprises an identifier (ID) of a logic port accessed by the roaming user terminal, a unique ID of the roaming user terminal, a state of the roaming user terminal, and a time that that the state changed,
      modify table item information related to the roaming user terminal based on the received information, wherein the table item information is in a table maintained by the processor,
      report the modified information of the roaming user terminal to an Authentication, Authorization, Accounting server (AAA Server),
      receive a confirmation message sent by the AAA server, and
      allow the roaming user terminal to access a network with an Internet Protocol (IP) address of the changed VLAN.

9. The BRAS according to claim 8, wherein the ID of the logic port accessed by the roaming user terminal comprises an AC identifier, an Access Point (AP) identifier, a radio identifier, and a logic port name.

10. The BRAS according to claim 8, wherein the unique ID of the roaming user terminal is Media Access Control (MAC) of the roaming user terminal, IP information of a previous VLAN of the roaming user terminal, and IP information of the changed VLAN of the roaming user terminal.

11. The BRAS according to claim 10, wherein the state of the roaming user terminal is roaming and the time that the state changed comprises a time at which roaming began.

12. An Authentication, Authorization, Accounting server (AAA Server) for preventing a roaming user terminal from re-authentication, comprising:
a processor; and
a memory on which is stored machine readable instructions that are to cause the processor to:
receive change information of the roaming user terminal with a changed Virtual Local Area Network (VLAN) from a Broadband Remote Access Server (BRAS), wherein the change information of the roaming user terminal with the changed VLAN comprises an identifier (ID) of a logic port accessed by the roaming user terminal, a unique ID of the roaming user terminal, a state of the roaming user terminal, and a time that the state changed,
modify table item information related to the roaming user terminal based on the received change information, and
return a confirmation message to the BRAS.

13. A system for preventing a roaming user terminal from re-authentication, comprising:
an Access Controller (AC);
a Broadband Remote Access Server (BRAS); and
an Authentication, Authorization, Accounting server (AAA Server),
wherein, upon receiving an access request from the roaming user terminal, the AC is to:
detect whether a Virtual Local Area Network (VLAN) of the roaming user terminal has changed,
when detecting that the VLAN of the roaming user terminal has changed, store the changed VLAN of the roaming user terminal,
report the changed information of the roaming user terminal to the BRAS; and
when detecting that the VLAN of the roaming user terminal has not changed, allow the roaming user terminal to access a network with an Internet Protocol (IP) address of the unchanged VLAN;
wherein the BRAS is to:
receive the changed information of the roaming user terminal with the changed VLAN that is reported by the AC, wherein the change information of the roaming user terminal with the changed VLAN comprises an identifier (ID) of a logic port accessed by the roaming user terminal, a unique ID of the roaming user terminal, a state of the roaming user terminal, and a time that the state changed,
modify table item information related to the roaming user terminal, wherein the table item information is in a table maintained by the BRAS,
report the modified information of the roaming user terminal to the AAA server,
receive a confirmation that update is complete from the AAA server, and
allow the roaming user terminal to access the network with the IP address of the changed VLAN;
wherein the AAA server is to modify table item information related to the roaming user terminal according to the modified information of the roaming user terminal with the changed VLAN received from the BRAS, and return a confirmation message to the BRAS.

* * * * *

UNITED STATES PATENT AND TRADEMARK OFFICE
CERTIFICATE OF CORRECTION

| | | |
|---|---|---|
| PATENT NO. | : 9,173,082 B2 | Page 1 of 1 |
| APPLICATION NO. | : 13/884559 | |
| DATED | : October 27, 2015 | |
| INVENTOR(S) | : Xiangqing Chang et al. | |

It is certified that error appears in the above-identified patent and that said Letters Patent is hereby corrected as shown below:

Claims

In column 8, line 46, in Claim 8, delete "that that" and insert -- that --, therefor.

Signed and Sealed this
Twenty-second Day of March, 2016

Michelle K. Lee
*Director of the United States Patent and Trademark Office*